G. G. HEPBURN.
BIPOLAR ELECTRODE ELECTROLYZER.
APPLICATION FILED AUG. 26, 1916.

1,213,871.

Patented Jan. 30, 1917.

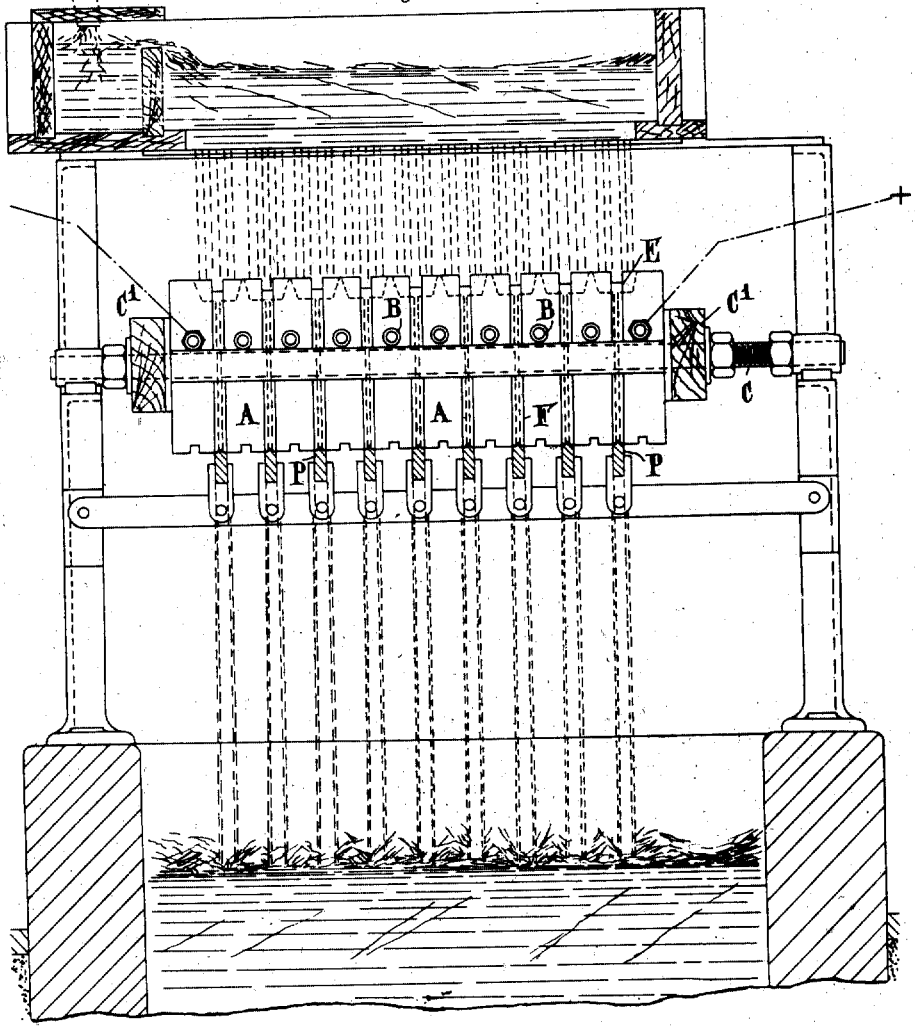

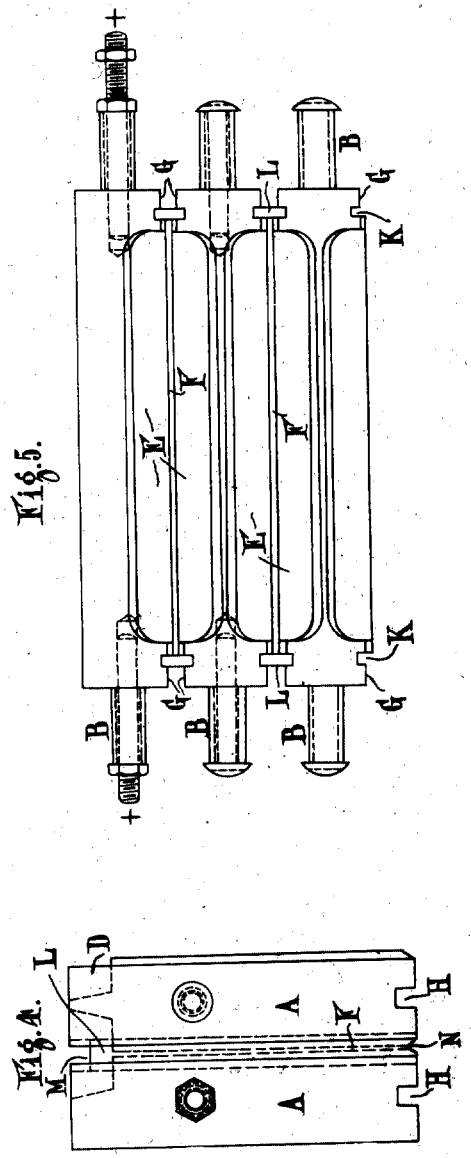
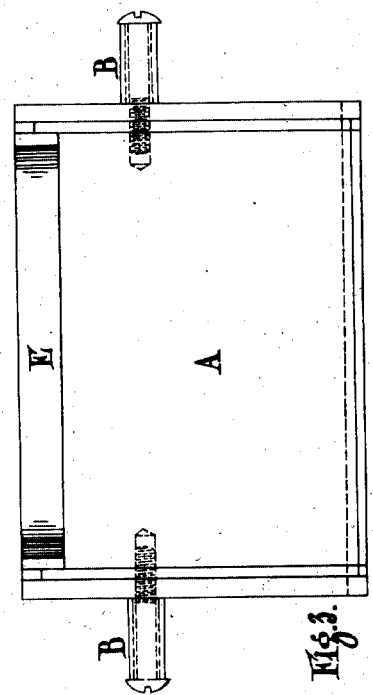
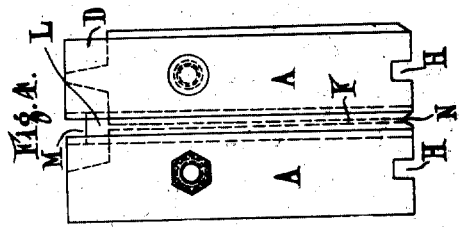

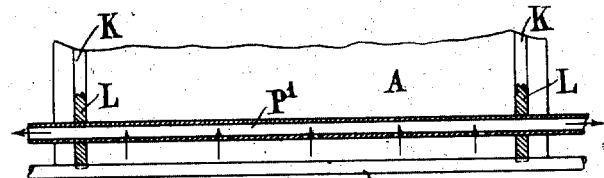
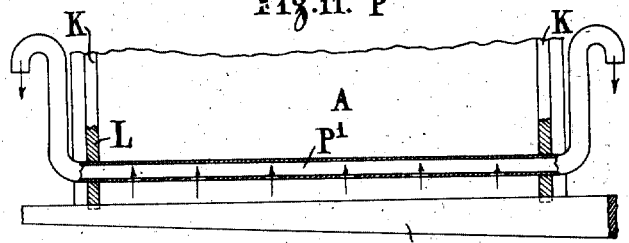
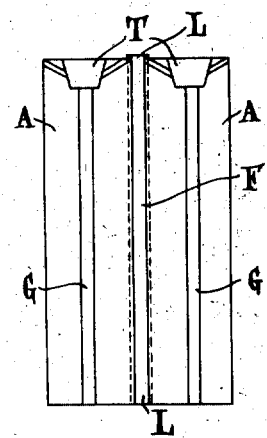
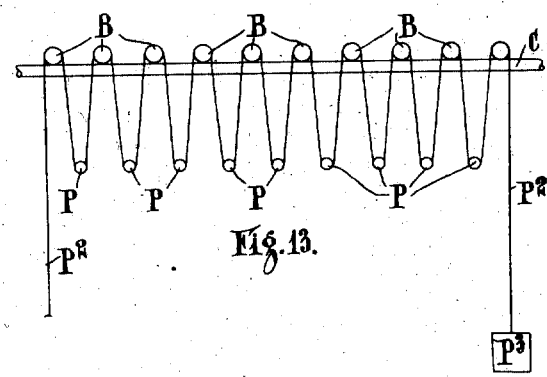
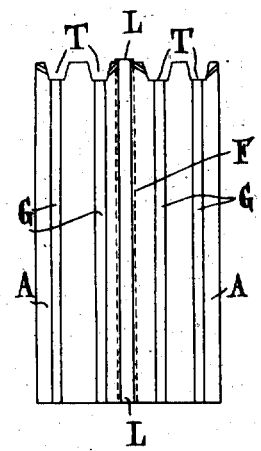
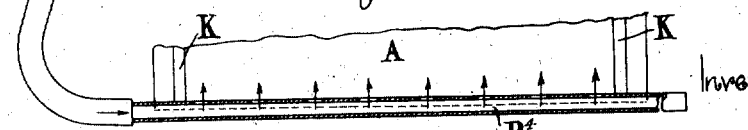

UNITED STATES PATENT OFFICE.

GEORGE GRANT HEPBURN, OF CHORLTON-CUM-HARDY, MANCHESTER, ENGLAND.

BIPOLAR-ELECTRODE ELECTROLYZER.

1,213,871.　　　　Specification of Letters Patent.　　Patented Jan. 30, 1917.

Application filed August 26, 1916.　Serial No. 117,043.

*To all whom it may concern:*

Be it known that I, GEORGE GRANT HEPBURN, doctor of philosophy, a subject of the King of Great Britain and Ireland, and resident of 52 Newport road, Chorlton-cum-Hardy, Manchester, in the county of Lancaster, England, have invented certain new and useful Improvements in Bipolar-Electrode Electrolyzers, of which the following is a specification.

This invention relates to bi-polar electrode electrolyzers more especially intended for the electrolysis of the chlorids of the alkali metals.

Heretofore bi-polar electrode electrolyzers have usually been arranged with the electrodes in a container comprising an open top vessel. The electrodes are held in position therein by firmly wedging them against the side walls of the container or by securing them in recesses in said side walls. With these arrangements, it is impossible to adjust the electrodes relatively to one another to compensate for wear without removing all the electrodes from the container and then replacing them in their new or adjusted positions. Further, the aforesaid electrolyzers are uneconomical in the consumption of electric current; this may be increased by current leakage between electrodes of adjacent cells, or by matter in suspension in the electrolyte settling in the cells, restricting the flow of the electrolyte and also the area available for the passage of the electric current.

In cases in which the electrodes are supported independently of any container, the spaces between the electrodes are completely closed in by insulation, cocks being provided for the inflow and outflow of the electrolyte. The electrodes with this arrangement are not capable of being brought very close together by reason of said inflow and outflow connections, and the difficulties arising from the accumulation of solid matter between the electrodes are not avoided.

The object of the present invention is to provide an improved arrangement of bi-polar electrode electrolyzer which can be made of any desired capacity without the necessity for any container therefor, in which the losses due to current leakage and the objectionable features arising from the collection of sediment are obviated, and in which the electrodes can be readily approximated to one another as they wear and can be used efficiently when brought very closely to one another.

My invention comprises the improved construction and combination of parts as hereinafter described and claimed.

Figure 1:
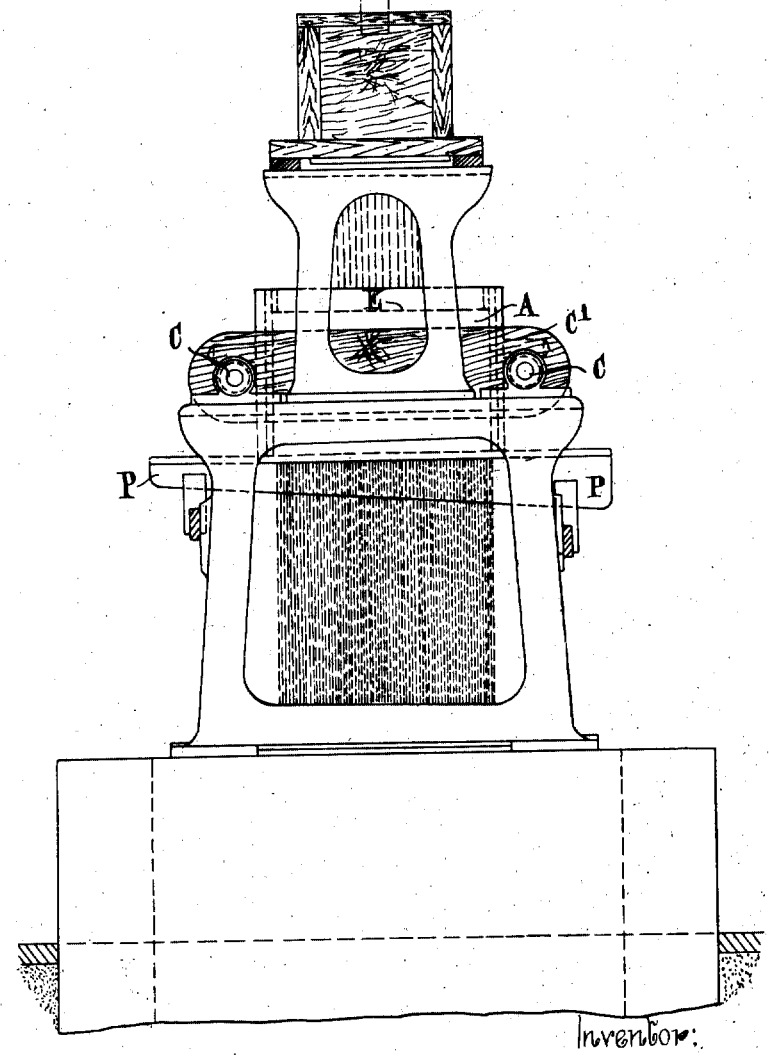
Figures 6, 7:
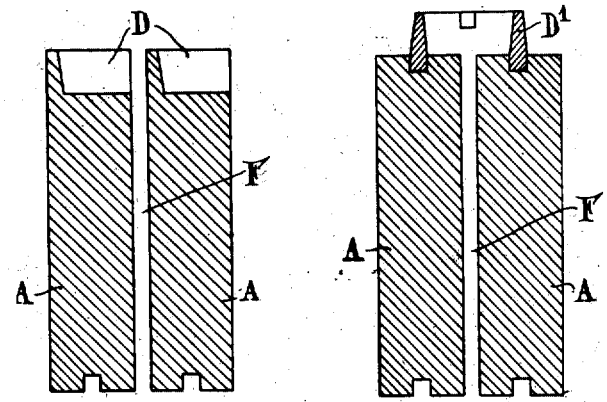
Figure 8:
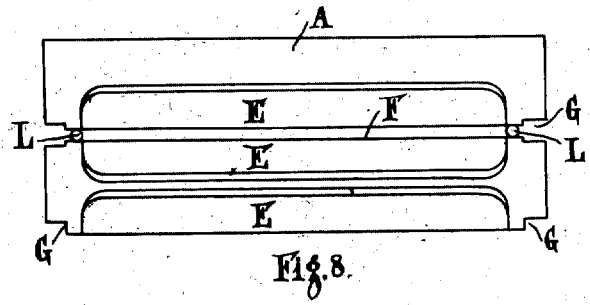

Referring to the accompanying sheets of explanatory drawings: Figure 1 is an end view of an electrolyzer constructed in one convenient form in accordance with my invention. Fig. 2 is a front view, partly in section, of the electrolyzer shown in Fig. 1. Fig. 3 is a side view showing an electrode. Fig. 4 is an end view showing an end and an intermediate electrode in position. Fig. 5 is a plan view of three electrodes forming part of an electrolyzer. Fig. 6 is a sectional view showing a modified form of electrode. Fig. 7 is a view similar to Fig. 6 but showing a further modified arrangement of electrode. Fig. 8 is a plan view similar to Fig. 5 but showing a modified arrangement of parts. Figs. 9, 10, 11 and 12 are detail views of various modifications of the electrolyte outflow control means of the cells. Figs. 13, 14, 15 and 16 are detail views of modifications to be hereinafter referred to.

The electrodes A are provided with projecting lugs B which rest upon bolts C by which the electrodes are supported and which also serve in conjunction with the end pieces $C^1$ to clamp the electrodes together. I may provide adjustable or compressible distance pieces between the lugs B so that the distance apart of the electrodes can be predetermined and varied to suit requirements. The upper part of each electrode may be cut out as shown in Figs. 1–5, or in Fig. 6, so as to form part of a trough or troughs as at D in such a manner that when the electrodes are suspended on the bolts C, troughs E (see Fig. 5) extend along the breadth of the electrolyzer in the upper part thereof. Such troughs form the upper part of the individual cells and communicate freely with the spaces F between the electrodes and below the troughs. These spaces F constitute the lower part of the individual cells.

Instead of the troughs being formed by cutting away the material of the electrodes, they may be formed by providing walls $D^1$ on the tops of the electrodes as shown in Fig. 7. The general arrangement of the trough will, in plan, be approximately as shown in Fig. 5. The electrodes near the vertical edges of the active faces are recessed or grooved as at K for the reception and support of a non-conducting piece or pieces L which form the side walls of the cells. A convenient method of forming said side walls is by running molten paraffin wax into the spaces to be occupied by the side walls after temporary arrangements have been made for its retention in the liquid state and until it solidifies. These side walls L also act as distance pieces keeping the electrodes apart and may in themselves be sufficient for this purpose. When the side walls are formed of a material such as paraffin wax which becomes plastic under the influence of heat, it is evident that by circulating hot water through the electrolyzer until the said material becomes plastic, and then exerting a lateral pressure on the electrodes, as by means of the bolts C, a convenient and simple method is provided for approximating the electrodes to each other to compensate for wear of same. The overflow from the cells passes over the top of the side walls through the gaps M, see Fig. 4. The adjacent vertical faces of the electrodes at each end of the latter are cut away as shown at G (Fig. 5) so as to provide a channel down which electrolyte from the ends of the troughs can flow. The faces of the electrodes thus form retaining walls for the overflow. The bottoms of the electrodes are also grooved at H to prevent the outflow from adjacent cells uniting along the bottom of the electrodes.

Instead of employing side walls as L between the electrodes, I may, as shown in plan in Fig. 8, provide a length of india-rubber tubing, india-rubber cord or other suitable insulating substance L between the electrodes. Such tubing or the like may extend in a continuous length from end to end of the electrolyzer, being zig-zagged up and down between the electrodes. The bolts C (Figs. 1 and 2) will exert the necessary pressure upon the said substance to make a liquid tight joint between the electrodes. The said tubing or the like acts in the same manner as the side walls aforesaid, provision being made for the overflow of electrolyte by recessing the electrodes or in any other convenient manner.

After bolting the electrodes A with their side walls L together by means of the bolts C, the electrolyzer may be used in the form so far described by feeding electrolyte into the troughs E. Such feeding may be accomplished by means as shown in Figs. 1 and 2 or in any other convenient manner. The electrolyte runs freely through the cells and out at the lower open end of same while the electric current is passing, the electrolyte being then pumped back again for refeeding into the troughs E. I may, however, if desired reduce the amount of pumping requisite with my improved electrolyzer by restricting the rate of outflow from the cells through the outlets N which extend from side wall to side wall of each cell. This may be accomplished by a movable tube, rod, bar, wedge or the like P of non-conducting material which may have a plain surface or be notched at frequent intervals transversely of its length or slotted along its length where it engages or almost engages the adjacent surface of the electrode which may be beveled as shown in Fig. 4. The wedges P may be shaped and supported as shown in Fig. 1 so that they can be readily moved to regulate the rate of flow of electrolyte and also be moved clear of the cells for allowing of the discharge of sediment from the cells. It will be understood that with the arrangements aforesaid, the electrolyte will descend substantially as a sheet in the lower part of the cells so that local heating arising from bad circulation will be avoided.

Figure 9:
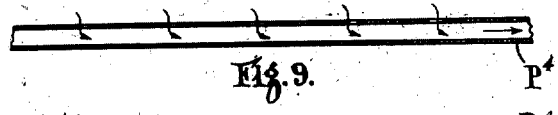
Figure 10:
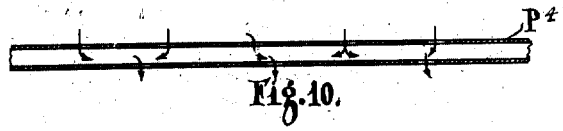

Instead of employing a solid bar, rod, wedge or the like as shown in Figs. 1 and 2 for restricting or regulating the rate of outflow of electrolyte, I may employ a tube $P^4$ as shown in Fig. 9 having apertures in its upper side through which the electrolyte passes from the cell to the interior of the tube and then discharges through the end of same. Or, the tube $P^4$ may have apertures in both its upper and lower sides as shown in Fig. 10. The tubes $P^4$ preferably make a good joint with the contacting portions of the electrodes, india-rubber or other suitable packing strips being employed if desired. In some cases, I may cause each movable rod, bar, wedge or the like P to close the bottom of its cell completely and provide a tube $P^1$ extending into the cell through the side walls as shown in Figs. 11 and 12 for the outflow of the electrolyte. By providing the apertures in the underside of the tube $P^1$, blocking of the same by sediment is obviated. I may provide means for controlling the movement of the rods, tubes, or the like P and $P^4$ so that all the cells can be opened and closed in a ready manner. Such means may comprise a string or insulated wire or the like $P^2$, see Fig. 13, one arranged at each side of the electrolyzer, passing over the lugs B of the electrodes and under the rods or the like P, the ends of the wire or the like being secured to the frame of the machine, or having weights as $P^3$ thereon at one end for holding the electrodes at the bottom of the cells. By raising the weights $P^3$, the rods or the like P will be allowed to descend clear of the electrodes.

Electrolyzers constructed in accordance with my invention are economical in operation and readily maintained in an efficient condition of service.

It will be obvious that with any of the arrangements shown in Figs. 9, 11 and 12, I may cause the electrolyte to enter the cell by the tube P⁴ or P¹ and to travel up between the electrodes and overflow over the side walls L. Such tube P⁴ or P¹ may be connected to a suitable source of electrolyte Q by a flexible or other connection R having a valve S thereon as shown diagrammatically in Fig. 14.

When arranging for an upward flow of the electrolyte through the cells, I may dispense with the troughs E before described and arrange for the overflow to take place from between the electrodes to gutters T in the tops of the electrodes, the electrolyte traveling down the side faces of the electrodes through grooves G. In the Fig. 15 arrangement one gutter T is provided for the overflow from adjoining cells. Such gutter may be arranged to empty directly into the grooves G so that there is no accumulation of electrolyte therein. Or, the electrolyte may be allowed to accumulate in the gutter and overflow into the grooves or be drawn off through an overflow pipe. In the Fig. 16 arrangement, two gutters are provided in each electrode. In all cases, the overflow from the cells may be drawn off through an overflow pipe or port instead of flowing down the sides of the electrodes.

Having now described my invention, what I claim as new and desire to secure by Letters Patent is:—

1. In bi-polar electrode electrolyzers, in combination, a plurality of electrodes spaced at the requisite distance apart, the intervening spaces being open at top and bottom, means between the electrodes forming side walls of the cells, means maintaining a flow of electrolyte through the cells, and overflow means preventing flooding of the cells, as set forth.

2. In bi-polar electrode electrolyzers, in combination, a plurality of electrodes spaced at the requisite distance apart, means between the electrodes forming side walls of the cells, means forming a movable bottom for each cell, means maintaining a flow of electrolyte through the cells, and overflow means preventing flooding of the cells, as set forth.

3. In bi-polar electrode electrolyzers, in combination, a plurality of electrodes spaced at adjustable distances apart, means supporting the electrodes and clamping them together, means between the electrodes forming side walls of the cells, means maintaining a flow of electrolyte through the cells, and overflow means preventing flooding of the cells, as set forth.

4. In bi-polar electrode electrolyzers, in combination, a plurality of electrodes spaced at adjustable distances apart, means supporting the electrodes and clamping them together, means between the electrodes forming side walls of the cells, means maintaining a flow of electrolyte through the cells, overflow means preventing flooding of the cells, and means preventing electrolyte from one cell uniting with that from an adjacent cell, as set forth.

5. In bi-polar electrode electrolyzers, in combination, a plurality of electrodes, means supporting the electrodes and clamping them together, means between the electrodes forming side walls of the cells, troughs delivering electrolyte to the cells, and overflow means preventing flooding of the cells, as set forth.

6. In bi-polar electrode electrolyzers, in combination, a plurality of electrodes, means between the electrodes forming side walls of the cells and spacing the electrodes apart, means supporting the electrodes and clamping them together, means maintaining a flow of electrolyte through the cells, and overflow means preventing flooding of the cells, as set forth.

7. In bi-polar electrode electrolyzers, in combination, a plurality of electrodes, compressible means between the electrodes forming side walls of the cells and spacing the electrodes apart, means supporting the electrodes and compressing the compressible means aforesaid, means maintaining a flow of electrolyte through the cells, and overflow means preventing flooding of the cells, as set forth.

8. In bi-polar electrode electrolyzers, in combination, a plurality of electrodes, means between the electrodes forming side walls of the cells and spacing the electrodes apart, means maintaining a flow of electrolyte through the cells, and overflow passages in the cell walls preventing flooding of the cells, as set forth.

9. In bi-polar electrode electrolyzers, in combination, a plurality of electrodes, compressible means between the electrodes forming side walls of the cells and spacing the electrodes apart, means supporting the electrodes and compressing the compressible means aforesaid, means maintaining a flow of electrolyte through the cells, overflow means preventing flooding of the cells, and means forming a movable bottom for each cell, as set forth.

10. In bi-polar electrode electrolyzers, in combination, a plurality of electrodes, compressible means between the electrodes forming side walls of the cells and spacing the electrodes apart, means supporting the electrodes and compressing the compressible means aforesaid, means maintaining a flow of electrolyte through the cells, overflow passages formed on the outer side of said compressible side walls and between the electrodes, and means forming a movable bottom for each cell, as set forth.

11. In bi-polar electrode electrolyzers, in combination, a plurality of electrodes, means supporting the electrodes, means between the electrodes forming the side walls of the cells, a trough at the upper part of each cell maintaining a downward flow of electrolyte through the cell, and overflow means preventing flooding of the cell, as set forth.

12. In bi-polar electrode electrolyzers, in combination, a plurality of electrodes, means supporting the electrodes, means between the electrodes forming the side walls of the cells, a trough at the upper part of each cell maintaining a downward flow of electrolyte through the cell, overflow means preventing flooding of the cells, and means forming a movable bottom for each cell, as set forth.

13. In bi-polar electrode electrolyzers, in combination, a plurality of electrodes, compressible means between the electrodes forming side walls of the cells and spacing the electrodes apart, means supporting the electrodes and compressing the compressible means aforesaid, a trough at the upper part of each cell maintaining a downward flow of electrolyte through the cell, means forming a movable bottom for each cell, and overflow means preventing flooding of the cells, as set forth.

14. In bi-polar electrode electrolyzers, in combination, plurality of electrodes, means supporting the electrodes, means between the electrodes forming the side walls of the cells, each electrode having a portion of at least one trough formed therein at its upper part, and overflow means preventing flooding of the cells, as set forth.

15. In bi-polar electrode electrolyzers, electrodes cut away to form a portion of at least one trough, as set forth.

16. In bi-polar electrode electrolyzers, in combination, a plurality of electrodes spaced at adjustable distances apart, means supporting the electrodes and clamping same together, means between the electrodes forming the side walls of the cells, each electrode having a portion of at least one electrolyte trough formed therein at its upper part, and a groove therein on its bottom side, overflow means preventing flooding of the cells, and means forming a movable bottom for each cell, as set forth.

17. In bi-polar electrode electrolyzers, in combination, a plurality of electrodes, having a portion of at least one trough formed in the upper part, and each having a groove in its bottom side, and being rabbeted and having a groove at the ends of its vertical active face, compressible means extending between the vertical grooves in the electrodes forming the side walls of the cells and spacing the electrodes apart, means supporting the electrodes and compressing said compressible means, an adjustable and removable bottom piece for each cell, the overflow from each cell passing over the side walls and between the rabbeted portions of the electrodes, as set forth.

18. In bi-polar electrode electrolyzers, in combination, a plurality of electrodes, means between the electrodes spacing the electrodes at the requisite distance apart and forming the side walls of the cells, means forming a movable bottom for each cell, means for actuating said movable bottoms simultaneously, means maintaining a flow of electrolyte through the cells, and overflow means preventing flooding of the cells, as set forth.

In testimony whereof I have signed my name to this specification in the presence of two subscribing witnesses.

GEORGE GRANT HEPBURN.

Witnesses:
 ARTHUR HUGHES,
 MYRA CROWE.